United States Patent
Fujita (10) Patent No.: US 10,746,984 B2
(45) Date of Patent: Aug. 18, 2020

(54) PROJECTION DISPLAY DEVICE WITH COVER

(71) Applicant: FUJIFILM Corporation, Tokyo (JP)

(72) Inventor: Koudai Fujita, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/357,341

(22) Filed: Mar. 19, 2019

(65) Prior Publication Data

US 2019/0212551 A1  Jul. 11, 2019

Related U.S. Application Data

(63) Continuation of application No. PCT/JP2017/029199, filed on Aug. 10, 2017.

(30) Foreign Application Priority Data

Sep. 21, 2016  (JP) .................................. 2016-184697

(51) Int. Cl.
G02B 27/00 (2006.01)
G02B 27/01 (2006.01)
B60K 35/00 (2006.01)
G03B 21/14 (2006.01)
(Continued)

(52) U.S. Cl.
CPC .......... *G02B 27/0006* (2013.01); *B60K 35/00* (2013.01); *G02B 27/0101* (2013.01);
(Continued)

(58) Field of Classification Search
CPC ................ G02B 27/0101; G02B 27/01; B60K 2370/1529
See application file for complete search history.

(56) References Cited

U.S. PATENT DOCUMENTS

2002/0084950 A1* 7/2002 Aoki .................. G02B 27/0101
345/7
2008/0049331 A1* 2/2008 Nakamura ......... G02B 27/0101
359/630
(Continued)

FOREIGN PATENT DOCUMENTS

JP  H04096778  8/1992
JP  H07101267  4/1995
(Continued)

OTHER PUBLICATIONS

"International Search Report (Form PCT/ISA/210) of PCT/JP2017/029199," dated Oct. 31, 2017 with English translation thereof, pp. 1-5.
(Continued)

*Primary Examiner* — Chun-Nan Lin
(74) *Attorney, Agent, or Firm* — JCIPRNET (57) ABSTRACT

A projection display device includes: a light modulation unit that spatially modulates, in accordance with image data that is input, light emitted by a light source; a housing that accommodates the light modulation unit; a projection optical system that is accommodated in the housing and projects the light that has been spatially modulated onto a projection surface of a vehicle through an opening portion of the housing; and a cover that closes the opening portion, the cover has a shape whose longitudinal direction is a direction extending from a driver's seat of the vehicle toward a passenger seat of the vehicle, and a front surface of the cover is closer to the projection surface than a reference plane and has a shape as defined herein.

15 Claims, 6 Drawing Sheets

1: automobile
2: windshield
8: opening portion
9: cover
100: head-up display
H: steering wheel
X: direction extending from the driver's seat toward the passenger's seat (51) Int. Cl.
*G09F 9/00* (2006.01)
*H04N 5/74* (2006.01)
*G03B 21/00* (2006.01)
*B60R 11/02* (2006.01)
*G03B 21/20* (2006.01)

(52) U.S. Cl.
CPC ......... *G02B 27/0149* (2013.01); *G03B 21/00* (2013.01); *G03B 21/14* (2013.01); *G09F 9/00* (2013.01); *H04N 5/74* (2013.01); *B60K 2370/334* (2019.05); *B60R 11/0229* (2013.01); *G02B 2027/0114* (2013.01); *G02B 2027/0141* (2013.01); *G02B 2027/0154* (2013.01); *G02B 2027/0167* (2013.01); *G03B 21/2013* (2013.01); *G03B 21/2033* (2013.01)

(56) References Cited

U.S. PATENT DOCUMENTS

| | | | | |
|---|---|---|---|---|
| 2013/0343053 | A1* | 12/2013 | Holman | G03B 21/00 362/241 |
| 2017/0320390 | A1* | 11/2017 | Sato | B60K 35/00 |
| 2017/0355265 | A1 | 12/2017 | Fujita | |
| 2018/0093567 | A1* | 4/2018 | Motomura | B60K 37/02 |

FOREIGN PATENT DOCUMENTS

| | | |
|---|---|---|
| JP | 2014126640 | 7/2014 |
| JP | 2016094147 | 5/2016 |
| JP | 2017029199 | 10/2017 |
| WO | 2016080274 | 5/2016 |
| WO | 2016143412 | 9/2016 |

OTHER PUBLICATIONS

"Written Opinion of the International Searching Authority (Form PCT/ISA/237) of PCT/JP2017/029199," dated Oct. 31, 2017, with English translation thereof, pp. 1-12.

Office Action of Japan Counterpart Application, with English translation thereof, dated May 14, 2019, pp. 1-3.

* cited by examiner

1: automobile
2: windshield
3: housing
4: dashboard
5: control unit
6: diffusion member
7: concave mirror
8: opening portion
9: cover
100: head-up display

FIG. 1

1: automobile
2: windshield
8: opening portion
9: cover
100: head-up display
H: steering wheel
X: direction extending from the driver's seat toward the passenger's seat

3: housing
8: opening portion
9: cover
X: direction extending from the driver's seat toward the passenger's seat

PROJECTION DISPLAY DEVICE WITH COVER

CROSS REFERENCE TO RELATED APPLICATION

This is a continuation of International Application No. PCT/JP2017/029199 filed on Aug. 10, 2017, and claims priority from Japanese Patent Application No. 2016-184697 filed on Sep. 21, 2016, the entire disclosures of which are incorporated herein by reference.

BACKGROUND OF THE INVENTION

1. Field of the Invention

The present invention relates to a projection display device.

2. Description of the Related Art

A head-up display (HUD) for a vehicle has been known. In the HUD, a combiner that is disposed on a windshield of various types of vehicles, such as an automobile, a train, a ship, a heavy machine, an aircraft, or an agricultural machine, or that is disposed near a position before the windshield is used as a screen, and light is projected onto the screen to display an image. The HUD enables a driver to visually recognize an image that is based on light projected from the HUD as a real image on the screen or as a virtual image in front of the screen.

JP2016-094147A discloses an HUD built in a dashboard of an automobile. In this HUD, an opening portion of a housing is covered with a light-transmissive cover to prevent the entry of an object, such as dirt or liquid, into the housing through the opening portion of the housing that emits image light. The light-transmissive cover is curved such that an automobile-front-side edge is lower than an automobile-rear-side edge and is inclined in a left-right direction or inside-outside direction of the automobile such that one corner portion of a curved surface is the lowest, so that the HUD fits better into the dashboard.

SUMMARY OF THE INVENTION

In an HUD for a vehicle, a housing opening portion from which image light to be projected onto a screen, such as a windshield or combiner, is emitted and a light-transmissive cover closing the opening portion may have a shape whose longitudinal direction is a direction in which a driver's seat and a passenger seat are arranged, thereby increasing the size of a display screen. For example, a configuration may be adopted in which an opening portion is elongated from a position in front of the driver's seat to a position in front of the passenger seat in a dashboard of an automobile.

As in this configuration, when the light-transmissive cover closing the opening portion of the housing of the HUD extends over a wide range of the dashboard, a person seated on the passenger seat is more likely to adhere an object, such as food or drink, to the light-transmissive cover than a person seated on the driver's seat. This is because a driver seated on the driver's seat concentrates on driving and the motions thereof are limited, whereas a fellow passenger seated on the passenger seat is in a free state with the motion thereof not being limited.

When the object adhered to the light-transmissive cover on the passenger side is liquid, the liquid may flow to the driver side. When the object is not liquid, the object may be moved to the driver side by wind or vibration. When the size of the display screen of the HUD is increased, important information, such as a warning, may be displayed in front of the driver's seat. Thus, a situation is to be prevented as much as possible where display in front of the driver's seat is hindered.

JP2016-094147A discloses a configuration in which an opening portion of a housing of an HUD is covered with a light-transmissive cover, but the light-transmissive cover is inclined from the passenger side toward the driver side of a dashboard. Thus, when the opening portion of the housing is elongated from the driver side toward the passenger side, an object adhered to the light-transmissive cover closing the opening portion on the passenger side is likely move to the driver side, and there is a possibility that image light emitted from the opening portion on the driver side is blocked to hinder display in front of the driver's seat.

The present invention has been made in view of the above-described circumstances, and an object of the present invention is to provide a projection display device capable of maintaining display in front of a driver's seat even when an object is adhered to a cover closing an opening portion of a housing.

A projection display device of the present invention includes: a light modulation unit that spatially modulates, in accordance with image data that is input, light emitted by a light source; a housing that accommodates the light modulation unit; a projection optical system that is accommodated in the housing and projects the light that has been spatially modulated onto a projection surface of a vehicle through an opening portion of the housing; and a cover that closes the opening portion, wherein the cover has a shape whose longitudinal direction is a direction extending from a driver's seat toward a passenger seat of the vehicle, and a front surface of the cover is closer to the projection surface than a reference plane is, the reference plane passing through a passenger-side end portion in the longitudinal direction of the front surface of the cover and being parallel to the longitudinal direction, and has a shape in which a distance from the reference plane gradually decreases from a position other than the passenger-side end portion in the longitudinal direction toward the passenger-side end portion.

According to the present invention, it is possible to provide a projection display device capable of maintaining display in front of a driver's seat even when an object is adhered to a cover closing an opening portion of a housing.

DESCRIPTION OF THE PREFERRED EMBODIMENTS

Hereinafter, an embodiment of the present invention will be described with reference to the drawings.

Figure 1:
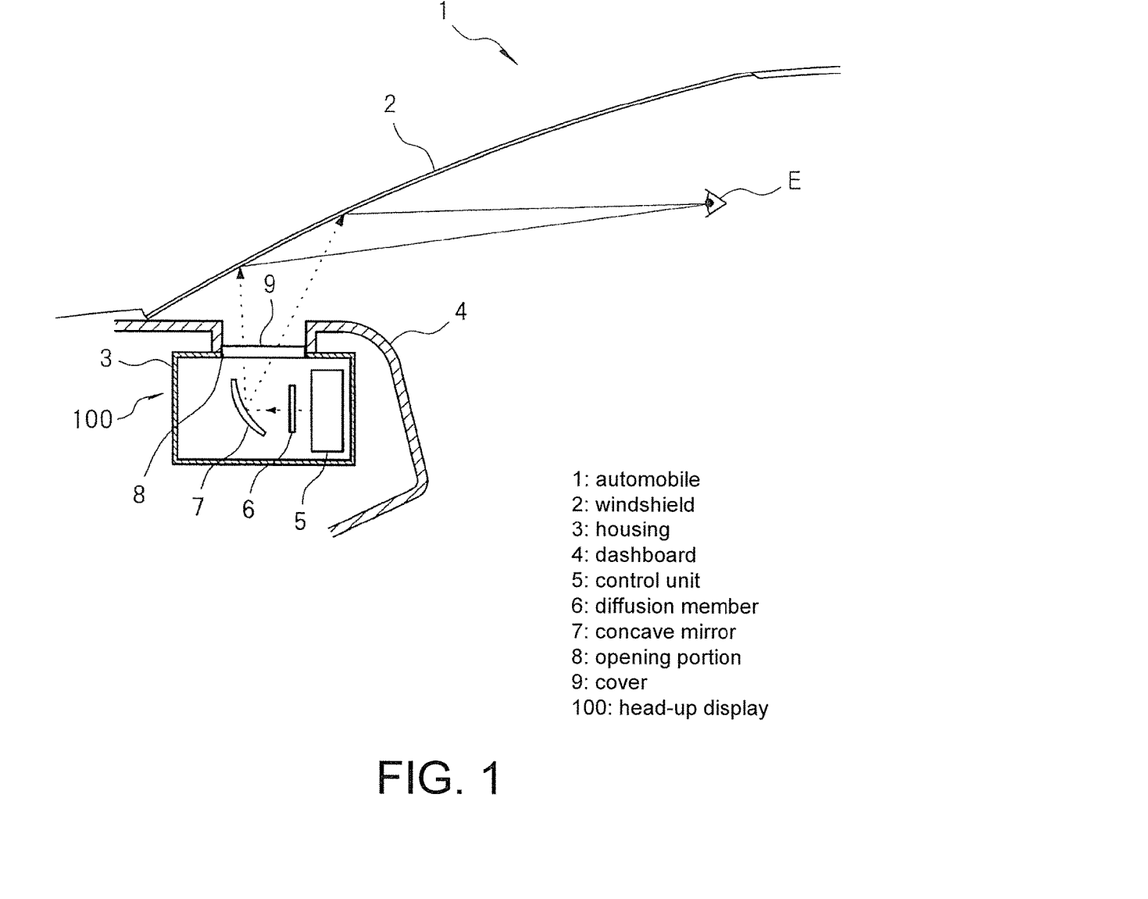
FIG. 1 is a diagram illustrating a schematic configuration of an HUD 100, which is an embodiment of a projection display device of the present invention.
Figure 2:
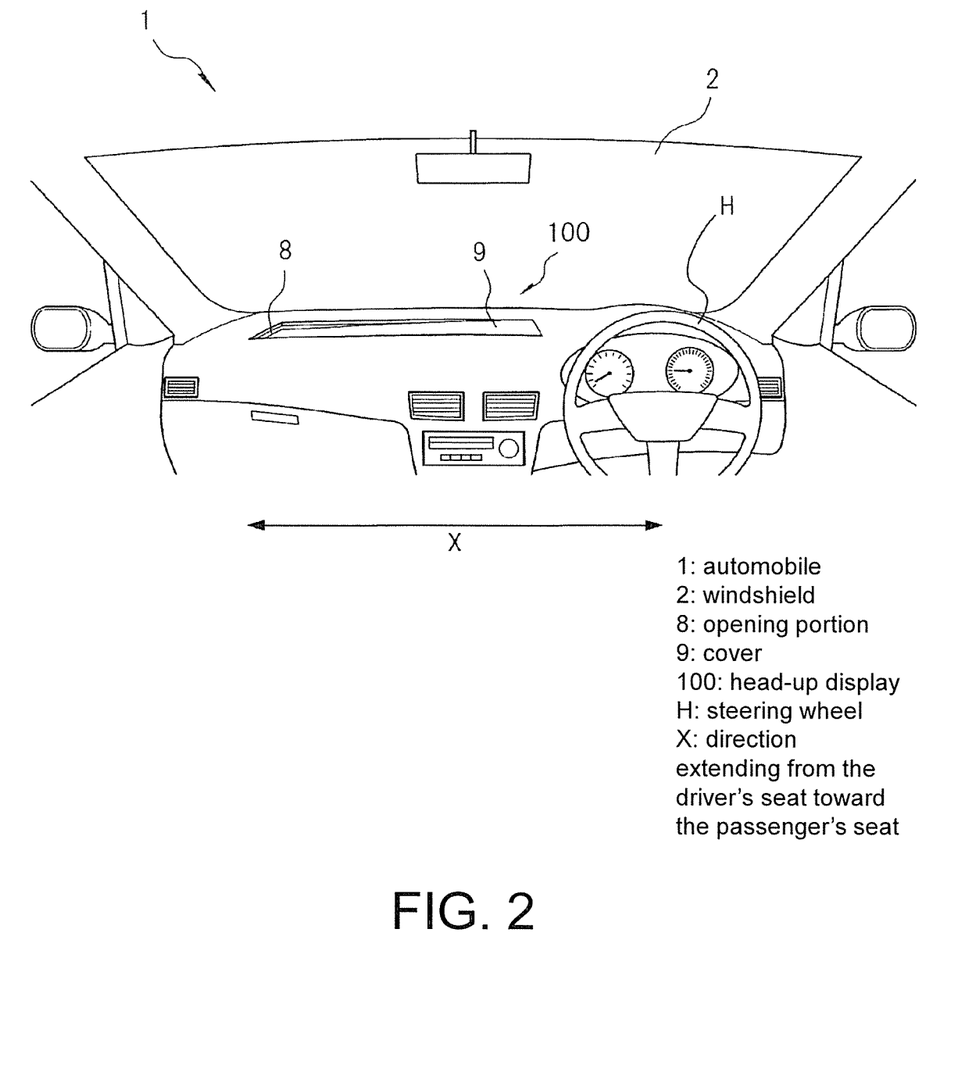
FIG. 2 is a diagram illustrating an external appearance of a cover 9 that closes an opening portion 8 of the HUD 100 illustrated in FIG. 1.

FIG. 1 is a diagram illustrating a schematic configuration of a head-up display (HUD) 100, which is an embodiment of a projection display device of the present invention. FIG. 2 is a diagram illustrating an external appearance of a cover 9 that closes an opening portion 8 of the HUD 100 illustrated in FIG. 1.

The HUD 100 is mounted in an automobile 1, uses a range of a part of a windshield 2 of the automobile 1 as a projection surface, and enables a driver of the automobile 1 to visually recognize a virtual image or real image by using image light projected onto the projection surface. The HUD 100 may be used by being mounted in a vehicle, such as a train, a heavy machine, a construction machine, an aircraft, a ship, or an agricultural machine, as well as an automobile.

The HUD 100 is built in a dashboard 4 inside the automobile 1 such that a part of the HUD 100 is exposed. The dashboard 4 is a member that contains, in its inside, built-in components including gauges for presenting information necessary for driving, such as a speedometer, a tachometer, a fuel gauge, a water temperature gauge, an odometer, or the like of the automobile 1.

The HUD 100 includes a box-shaped housing 3 accommodating a control unit 5 that includes a light source and a light modulation unit that spatially modulates, in accordance with image data, light emitted by the light source; and a diffusion member 6 and a concave mirror 7 that constitute a projection optical system that projects, onto the windshield 2, image light that has been spatially modulated by the light modulation unit. The configuration of the projection optical system is an example and is not limited to that illustrated in FIG. 1.

The diffusion member 6 is a member that diffuses the image light that has been spatially modulated by the light modulation unit of the control unit 5, thereby making a plane light source. As the diffusion member 6, a micromirror array having a fine structure on its surface, a diffusion mirror, a microlens-array (MLA) diffuser, a reflection holographic diffuser, or the like is used.

The concave mirror 7 enlarges the image light diffused by the diffusion member 6 and reflects the image light toward the projection surface of the windshield 2. The housing 3 is provided with the opening portion 8, and the image light reflected by the concave mirror 7 passes through the opening portion 8 and is projected toward the projection surface of the windshield 2.

The windshield 2 is processed so that the image light projected through the opening portion 8 is reflected in the direction of eyes E of the driver. The image light is reflected by the windshield 2 and enter the eyes E of the driver. Accordingly, the driver is able to visually recognize a virtual image or real image that is based on the image light.

The opening portion 8 of the housing 3 is closed with the cover 9 formed of a transparent member allowing image light to pass therethrough, such as resin or glass. The opening portion 8 is an emission window for allowing image light reflected by the concave mirror 7 to be emitted from the housing 3. The cover 9 is a member that prevents the entry of a foreign object, such as dirt or liquid, into the housing 3 through the opening portion 8.

As illustrated in FIG. 2, the planar shape of each of the opening portion 8 of the housing 3 and the cover 9 that closes the opening portion 8 viewed from a direction in which image light is emitted is a rectangle whose longitudinal direction is a direction X extending from the driver's seat toward the passenger seat of the automobile 1, so as to increase the size of a display screen that is based on image light projected onto the windshield 2. The automobile 1 has a configuration in which the driver's seat is disposed at a position facing a steering wheel H and the passenger seat is disposed to the left of the driver's seat.

The direction X extending from the driver's seat toward the passenger seat of the automobile 1 is the same as a direction substantially orthogonal to the driving direction of the automobile 1 when the automobile 1 drives straight. A state where two directions are substantially orthogonal to each other means that the angle between the two directions is in the range from 70 degrees to 110 degrees.

The HUD 100 adopts a scheme of projecting image light onto the windshield 2. Alternatively, the HUD 100 may adopt a scheme of projecting image light onto a combiner (not illustrated) disposed before the windshield 2. In this case, the combiner constitutes a projection surface.

Figure 3:
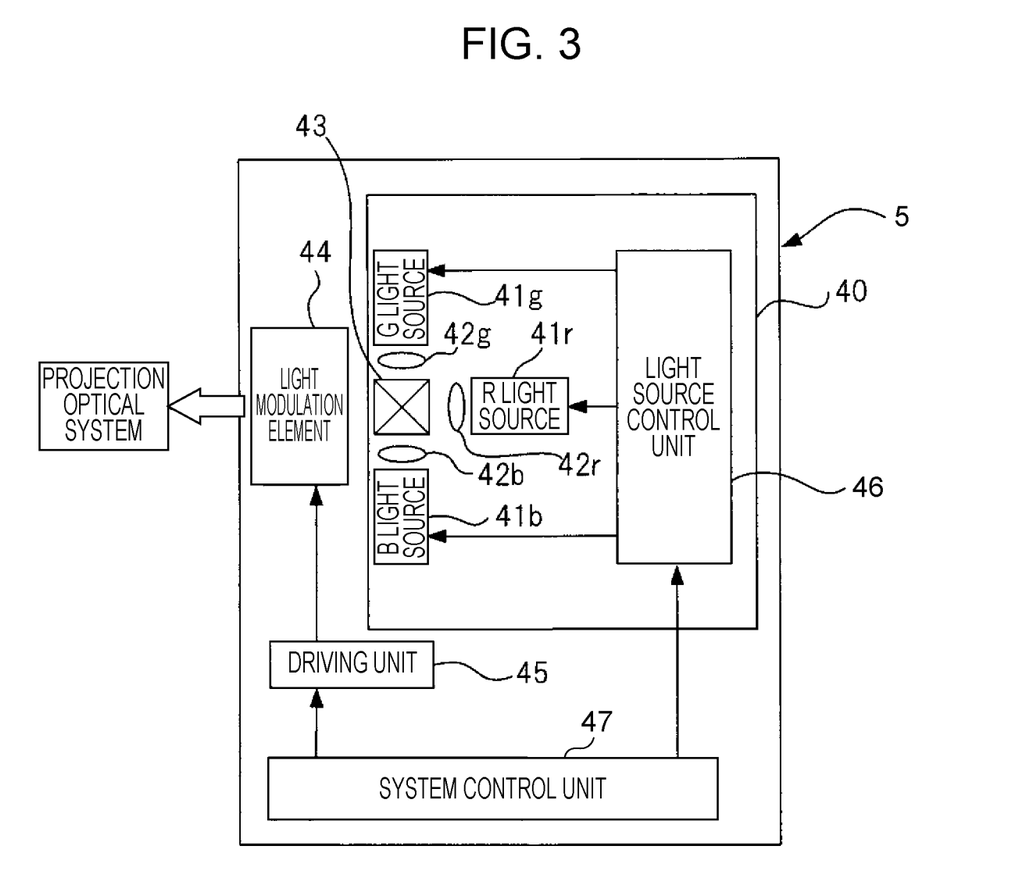
FIG. 3 is a schematic diagram illustrating an example of an internal configuration of a control unit 5 accommodated in a housing 3 of the HUD 100 illustrated in FIG. 1.

FIG. 3 is a schematic diagram illustrating an example of an internal configuration of the control unit 5 accommodated in the housing 3 of the HUD 100 illustrated in FIG. 1.

As illustrated in FIG. 3, the control unit 5 of the HUD 100 includes a light source unit 40, a light modulation element 44, a driving unit 45 that drives the light modulation element 44, and a system control unit 47 that centrally controls the entire HUD 100.

The system control unit 47 includes a processor, a read only memory (ROM) storing a program or the like executed by the processor, and a random access memory (RAM) functioning as a work memory of the processor.

The light source unit 40 includes a light source control unit 46, an R light source 41r serving as a red light source that emits red light, a G light source 41g serving as a green light source that emits green light, a B light source 41b serving as a blue light source that emits blue light, a dichroic prism 43, a collimator lens 42r provided between the R light source 41r and the dichroic prism 43, a collimator lens 42g provided between the G light source 41g and the dichroic prism 43, and a collimator lens 42b provided between the B light source 41b and the dichroic prism 43. The R light source 41r, the G light source 41g, and the B light source 41b constitute a light source of the HUD 100.

The dichroic prism 43 is an optical member for guiding rays of light emitted by the R light source 41r, the G light source 41g, and the B light source 41b to an identical light path. The dichroic prism 43 allows red light collimated by the collimator lens 42r to pass therethrough and emits the red light to the light modulation element 44. In addition, the dichroic prism 43 allows green light collimated by the collimator lens 42g to be reflected thereby and emits the green light to the light modulation element 44. Furthermore, the dichroic prism 43 allows blue light collimated by the collimator lens 42b to be reflected thereby and emits the blue light to the light modulation element 44. The optical member having such a function is not limited to the dichroic prism. For example, a cross dichroic mirror may be used.

A light emitting element, such as a laser or a light emitting diode (LED), is used as each of the R light source 41r, the G light source 41g, and the B light source 41b. The light source of the HUD 100 is not limited to the three light sources, that is, the R light source 41r, the G light source 41g, and the B light source 41b, and may be constituted by one light source, two light sources, or four or more light sources.

The light source control unit 46 controls each of the R light source 41r, the G light source 41g, and the B light source 41b, and performs control to cause light to be emitted by each of the R light source 41r, the G light source 41g, and the B light source 41b.

The light modulation element 44 spatially modulates, in accordance with image data received from the system control unit 47, the rays of light emitted by the R light source 41r, the G light source 41g, and the B light source 41b and emitted from the dichroic prism 43.

As the light modulation element 44, for example, liquid crystal on silicon (LCOS), a digital micromirror device (DMD), a micro electro mechanical systems (MEMS) element, a liquid crystal display element, or the like may be used.

The driving unit 45 drives the light modulation element 44 in accordance with image data received from the system control unit 47 and causes image light that has been spatially modulated in accordance with the image data (red image light, blue image light, and green image light) to be emitted from the light modulation element 44 to the diffusion member 6 of the projection optical system. The light modulation element 44 and the driving unit 45 constitute a light modulation unit of the HUD 100.

The projection optical system constituted by the diffusion member 6 and the concave mirror 7 illustrated in FIG. 1 is optically designed so that an image that is based on image light projected onto the windshield 2 can be visually recognized by the driver as a virtual image at a position in front of the windshield 2. The projection optical system may be optically designed so that the image that is based on the image light can be visually recognized by the driver as a real image on the windshield 2.

The system control unit 47 controls the light source control unit 46 and the driving unit 45 and causes image light that has been spatially modulated in accordance with image data to be emitted to the diffusion member 6.

Figure 4:
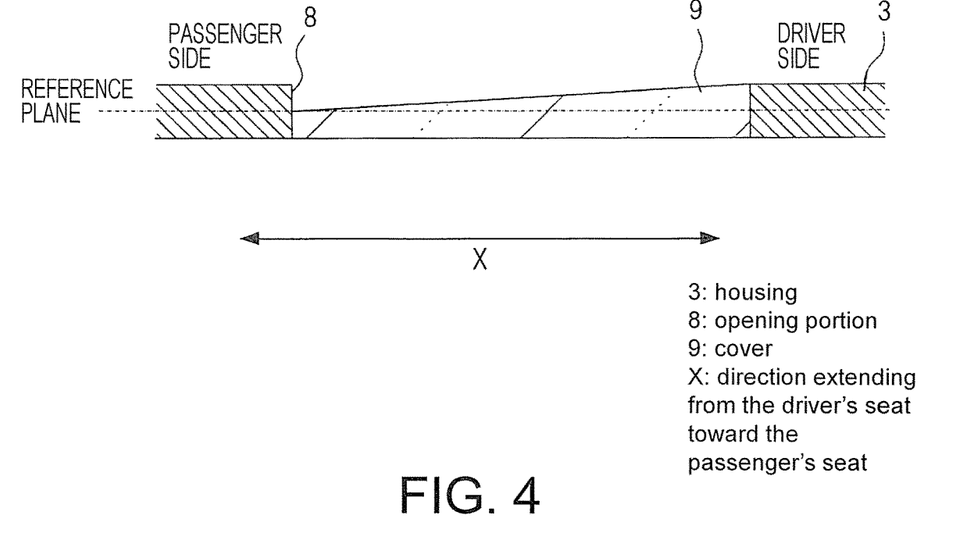
FIG. 4 is a cross-sectional view taken along a longitudinal direction of the cover 9 that closes the opening portion 8 of the housing 3 of the HUD 100 illustrated in FIG. 1.

FIG. 4 is a cross-sectional view taken along a longitudinal direction of the cover 9 that closes the opening portion 8 of the housing 3 of the HUD 100 illustrated in FIG. 1.

As illustrated in FIG. 4, a front surface (the surface facing the windshield 2) of the cover 9 is closer to the projection surface of the windshield 2 than a reference plane is, the reference plane passing through a passenger-side end portion in the direction X of the front surface of the cover 9 and being horizontal to the direction X, and has a shape in which the distance from the reference plane gradually decreases from a driver-side end portion in the direction X toward the passenger-side end portion.

The shape of a rear surface (the surface facing the inside of the housing 3) of the cover 9 is not specified. In the example in FIG. 4, the rear surface is horizontal to the reference plane.

The cover 9 illustrated in FIG. 4 has a configuration in which the distance from the reference plane to the front surface of the cover 9 linearly decreases from the driver-side end portion toward the passenger-side end portion. That is, the front surface of the cover 9 is a plane surface that is inclined with respect to the reference plane from the driver side toward the passenger side.

With the configuration of the cover 9 illustrated in FIG. 4, when an object is adhered to a passenger-side region of the front surface of the cover 9, a movement of the object to a driver-side region can be prevented. Thus, display in front of the driver's seat can be maintained.

In addition, with the configuration of the cover 9 illustrated in FIG. 4, no matter where on the front surface of the cover 9 an object is adhered, the object can be moved to the passenger-side end portion along the slope on the front surface of the cover 9. Thus, even when an object is adhered to the cover 9 on the driver side, display in front of the driver's seat can be maintained.

Figure 5:
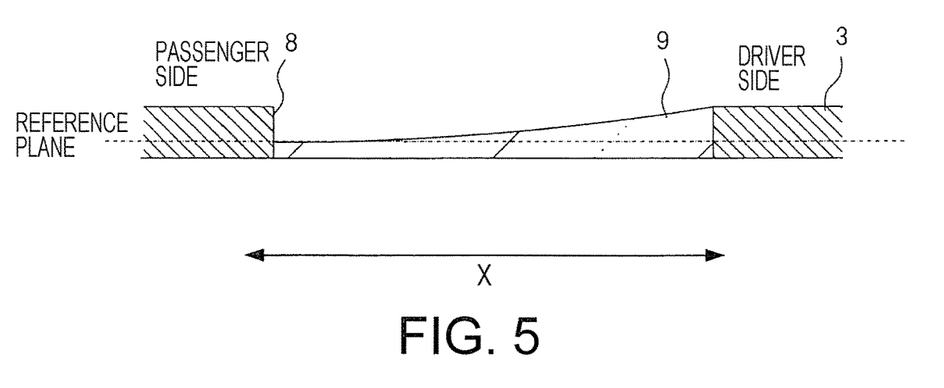
FIG. 5 is a diagram illustrating a first modification example of the cover 9 of the HUD 100 illustrated in FIG. 1 and is a cross-sectional view taken along the longitudinal direction of the cover 9.

FIG. 5 is a diagram illustrating a first modification example of the cover 9 of the HUD 100 illustrated in FIG. 1 and is a cross-sectional view taken along the longitudinal direction of the cover 9.

The front surface of the cover 9 illustrated in FIG. 5 has a shape in which the distance from the reference plane decreases gradually and curvilinearly from the driver-side end portion toward the passenger-side end portion in the direction X.

With the configuration of the cover 9 illustrated in FIG. 5, an effect similar to that of the cover 9 illustrated in FIG. 4 can be obtained.

In addition, with the configuration of the cover 9 illustrated in FIG. 5, when an object is adhered to the front surface on the driver side, a movement of the object toward the passenger side can be promoted by adjusting the curve of the front surface of the cover 9.

For example, the front surface of the cover 9 illustrated in FIG. 5 may be configured so that the amount of change in the distance from the reference plane increases toward the driver side in the direction X. Accordingly, when an object is adhered to the cover 9 on the driver side, the object can be more effectively moved toward the passenger side.

Figure 6:
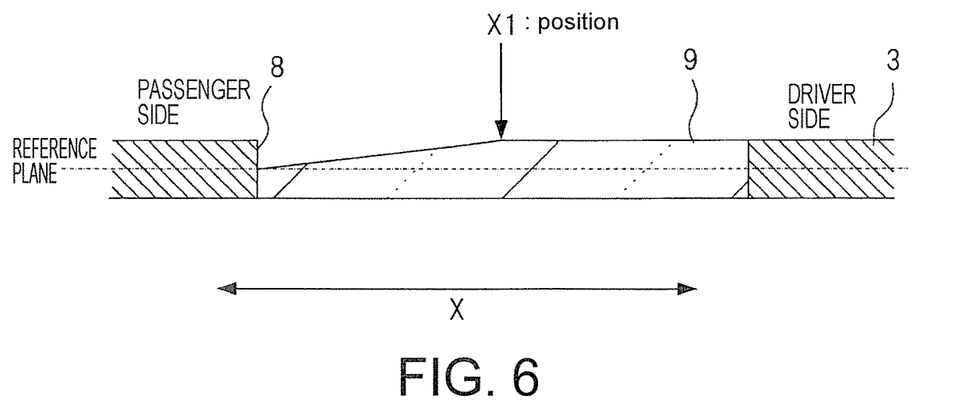
FIG. 6 is a diagram illustrating a second modification example of the cover 9 of the HUD 100 illustrated in FIG. 1 and is a cross-sectional view taken along the longitudinal direction of the cover 9.

FIG. 6 is a diagram illustrating a second modification example of the cover 9 of the HUD 100 illustrated in FIG. 1 and is a cross-sectional view taken along the longitudinal direction of the cover 9.

The front surface of the cover 9 illustrated in FIG. 6 has a shape in which the distance from the reference plane decreases gradually and linearly from an arbitrary position X1 between the driver-side end portion and the passenger-side end portion in the direction X (the midpoint between both the end portions in the example in FIG. 6) toward the passenger-side end portion, and the distance from the reference plane is constant from the position X1 to the driver-side end portion.

With the configuration of the cover 9 illustrated in FIG. 6, the thickness thereof can be made constant on the driver side. For example, assume a configuration in which two projection units, each formed of a pair of the projection optical system and the control unit 5, are provided in the housing 3, one of the projection units emits image light from a region to the left of the position X1 of the cover 9 illustrated in FIG. 6, and the other projection unit emits image light from a region to the right of the position X1 of the cover 9 illustrated in FIG. 6.

In this configuration, with the cover 9 illustrated in FIG. 6 being adopted, it is not necessary to consider the occurrence of distortion, resulting from the shape of the front surface of the cover 9, of a virtual image or real image that is based on image light emitted from the other projection unit. Thus, it becomes easy to design a projection optical system for eliminating distortion of a virtual image or real image or to correct image data, and the manufacturing cost of the HUD 100 can be reduced.

Figure 7:
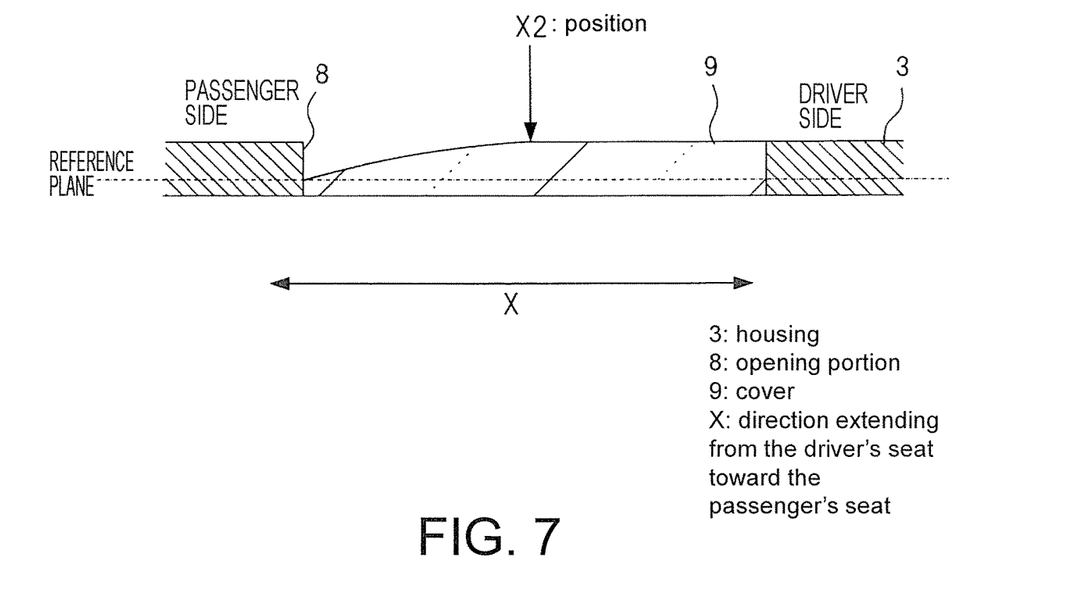
FIG. 7 is a diagram illustrating a third modification example of the cover 9 of the HUD 100 illustrated in FIG. 1 and is a cross-sectional view taken along the longitudinal direction of the cover 9.

FIG. 7 is a diagram illustrating a third modification example of the cover 9 of the HUD 100 illustrated in FIG. 1 and is a cross-sectional view taken along the longitudinal direction of the cover 9.

The front surface of the cover 9 illustrated in FIG. 7 has a shape in which the distance from the reference plane decreases gradually and curvilinearly from an arbitrary position X2 between the driver-side end portion and the passenger-side end portion in the direction X (the midpoint between both the end portions in the example in FIG. 7) toward the passenger-side end portion, and the distance from the reference plane is constant from the position X2 to the driver-side end portion.

With the configuration of the cover 9 illustrated in FIG. 7, the thickness thereof can be made constant on the driver side. Thus, an effect similar to that of the cover 9 illustrated in FIG. 6 can be obtained.

Figure 8:
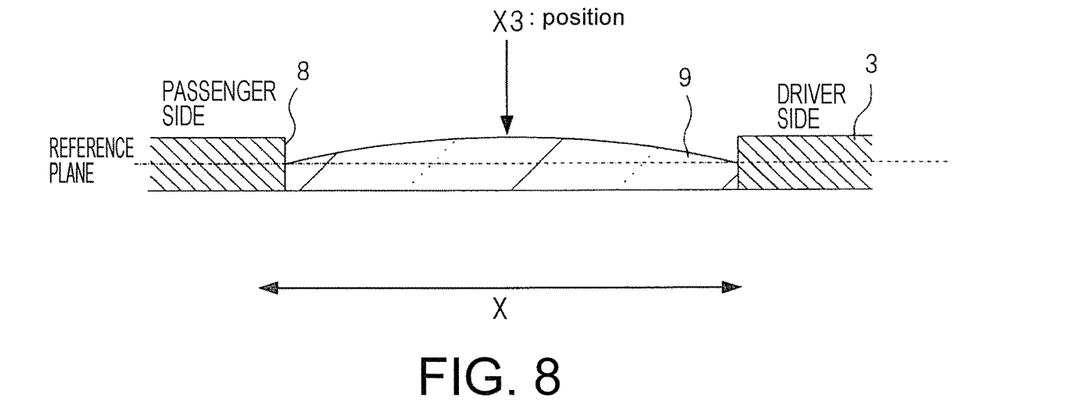
FIG. 8 is a diagram illustrating a fourth modification example of the cover 9 of the HUD 100 illustrated in FIG. 1 and is a cross-sectional view taken along the longitudinal direction of the cover 9.

FIG. 8 is a diagram illustrating a fourth modification example of the cover 9 of the HUD 100 illustrated in FIG. 1 and is a cross-sectional view taken along the longitudinal direction of the cover 9.

The front surface of the cover 9 illustrated in FIG. 8 has a shape in which the distance from the reference plane decreases gradually and curvilinearly from an arbitrary position X3 between the driver-side end portion and the passenger-side end portion in the direction X (the midpoint between both the end portions in the example in FIG. 8) toward the passenger-side end portion, and also the distance from the reference plane decreases gradually and curvilinearly from the position X3 toward the driver-side end portion.

With the configuration of the cover 9 illustrated in FIG. 8, when an object is adhered to a passenger-side region (the region to be left of the position X3) of the front surface of the cover 9, a movement of the object to the driver side can be prevented. Thus, display in front of the driver's seat can be maintained.

The cover 9 illustrated in FIG. 8 may have a shape in which the cross section taken along the direction X is line-symmetric about the position X3, and thus the HUD 100 with good design can be provided.

With such a line-symmetric shape of the cover 9, it becomes easy to design the projection optical system of the HUD 100 to fit the shape of the cover 9 or to correct image data to fit the shape of the cover 9.

Figure 9:
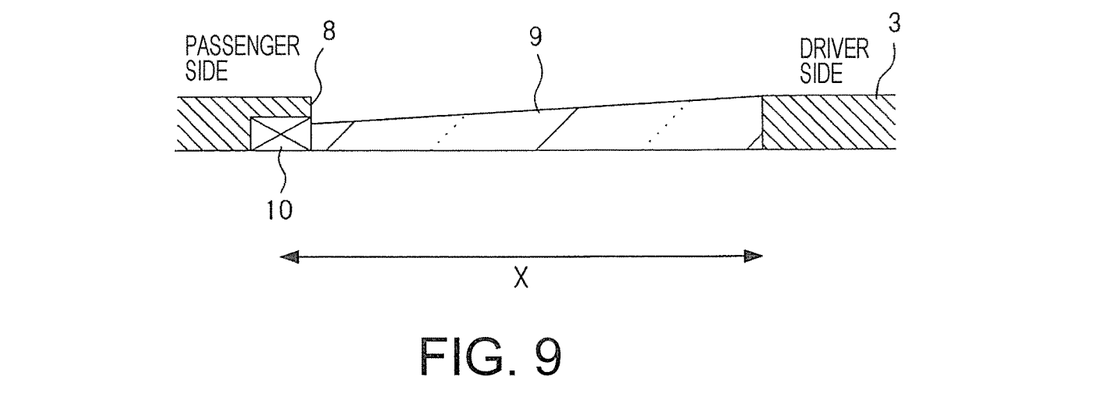
FIG. 9 is a diagram illustrating a first modification example of the HUD 100 illustrated in FIG. 1 and is a cross-sectional view taken along a direction X near the opening portion 8 of the housing 3.

FIG. 9 is a diagram illustrating a first modification example of the HUD 100 illustrated in FIG. 1 and is a cross-sectional view taken along the direction X near the opening portion 8 of the housing 3.

The HUD 100 illustrated in FIG. 9 has the same configuration as that of the HUD 100 illustrated in FIG. 1 except that a part of the housing 3 is provided with a discharge unit 10 to which an object adhered to the front surface of the cover 9 and moved to the passenger-side end portion is to be discharged.

Figure 10:
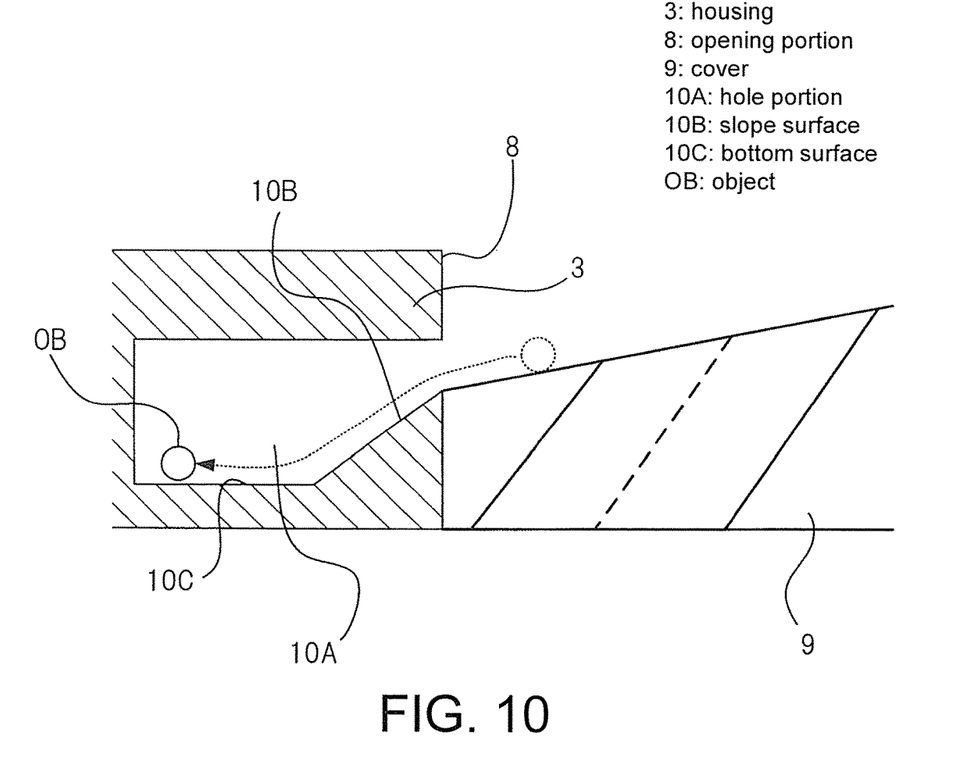
FIG. 10 is a diagram illustrating an example of a detailed configuration of a discharge unit 10 illustrated in FIG. 9.

FIG. 10 is a diagram illustrating an example of a detailed configuration of the discharge unit 10 illustrated in FIG. 9.

As illustrated in FIG. 10, the discharge unit 10 is constituted by a hole portion 10A provided at a portion of the housing 3 facing the passenger-side end portion in the direction X of the front surface of the cover 9.

One end in the direction X of an inner surface of the hole portion 10A is in contact with the passenger-side end portion in the direction X of the front surface of the cover 9, and the other end in the direction X thereof has a slope surface 10B that is in contact with a bottom surface 10C of the hole portion 10A. An object OB adhered to the front surface of the cover 9 and moved on the front surface moves to the bottom surface 10C via the slope surface 10B, thereby being discharged from the front surface of the cover 9.

As described above, according to the HUD 100 having the discharge unit 10, when an object is adhered to the front surface of the cover 9, retention of the object on the front surface of the cover 9 can be prevented. Thus, display of an image based on image light projected onto the windshield 2 on not only the driver side but also the passenger side can be maintained.

Preferably, the HUD 100 illustrated in FIG. 9 further has a suction mechanism that sucks air in the hole portion 10A illustrated in FIG. 10. With this configuration, a movement of the object OB from the hole portion 10A to the front surface of the cover 9 can be reliably prevented.

Preferably, the HUD 100 illustrated in FIG. 9 further has an object removing unit that forcibly moves an object adhered to the front surface of the cover 9 to the discharge unit 10 to remove the object.

Figure 11:
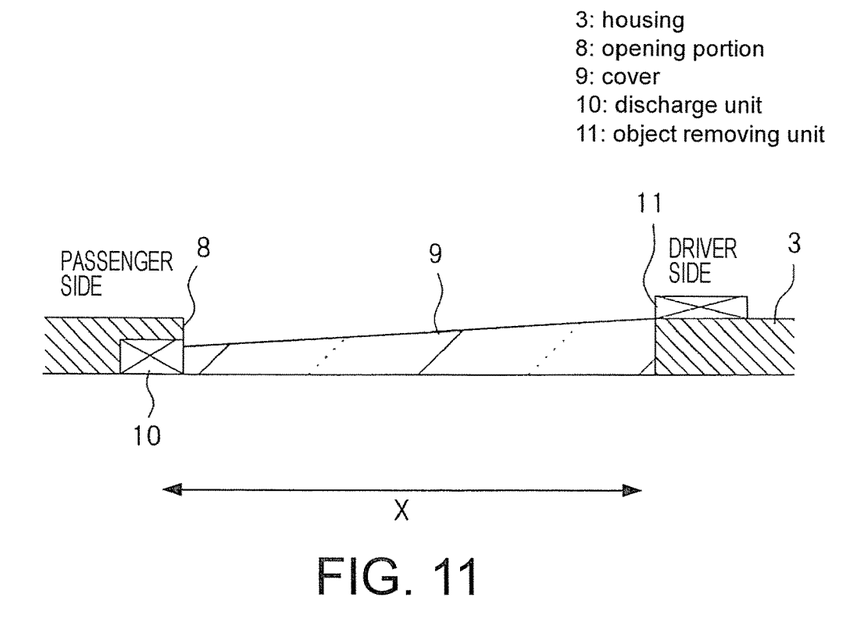
FIG. 11 is a diagram illustrating a modification example of the HUD 100 illustrated in FIG. 9.

FIG. 11 is a diagram illustrating a modification example of the HUD 100 illustrated in FIG. 9. The HUD 100 illustrated in FIG. 11 has the same configuration as that illustrated in FIG. 9 except that an object removing unit 11 is added.

The object removing unit 11 is constituted by a wind sending mechanism that blows wind in the direction X. When the wind sending mechanism sends wind, an object adhered to the front surface of the cover 9 quickly moves on the front surface of the cover 9 and is discharged from the discharge unit 10.

As described above, according to the HUD 100 illustrated in FIG. 11, an object adhered to the front surface of the cover 9 can be quickly moved to the discharge unit 10 to remove it from the front surface of the cover 9, and a period over which image light is blocked by the object can be minimized. As a result, display quality can be enhanced.

In the description given above, the cover 9 is fitted to the opening portion 8, but it is sufficient that the cover 9 be able to close the opening portion 8. For example, the cover 9 may be fixed to an outer peripheral surface of the housing 3 and the entire opening portion 8 may be covered with the rear surface of the cover 9, so as to close the opening portion 8.

As described above, this specification discloses the followings.

(1) A projection display device including: a light modulation unit that spatially modulates, in accordance with image data that is input, light emitted by a light source; a housing that accommodates the light modulation unit; a projection optical system that is accommodated in the housing and projects the light that has been spatially modulated onto a projection surface of a vehicle through an opening portion of the housing; and a cover that closes the opening portion, wherein the cover has a shape whose longitudinal direction is a direction extending from a driver's seat toward a passenger seat of the vehicle, and a front surface of the cover is closer to the projection surface than a reference plane is, the reference plane passing through a passenger-side end portion in the longitudinal direction of the front surface of the cover and being parallel to the longitudinal direction, and has a shape in which a distance from the reference plane gradually decreases from a position other than the passenger-side end portion in the longitudinal direction toward the passenger-side end portion.

(2) The projection display device described in (1), wherein the position is a position of a driver-side end portion in the longitudinal direction of the front surface of the cover.

(3) The projection display device described in (1), wherein the position is a position between a driver-side end portion in the longitudinal direction of the front surface of the cover and the passenger-side end portion.

(4) The projection display device described in (3), wherein the distance to the front surface of the cover is constant from the position to the driver-side end portion.

(5) The projection display device described in any one of (1) to (4), further including a discharge unit to which an object adhered to the front surface of the cover and moved to the passenger-side end portion is to be discharged.

(6) The projection display device described in (5), further including an object removing unit that moves an object adhered to the front surface of the cover to the discharge unit to remove the object.

The present invention is able to increase the product value of an automobile when applied to the automobile.

The present invention has been described above based on a specific embodiment. The present invention is not limited to this embodiment, and various changes are possible without deviating from the technical spirit of the disclosed invention.

The present application is based on Japanese Patent Application (JP2016-184697) filed on Sep. 21, 2016, the entire content of which is incorporated herein.

REFERENCE SIGNS LIST

100 HUD
1 automobile
2 windshield
3 housing
4 dashboard
5 control unit
6 diffusion member
7 concave mirror
8 opening portion
9 cover
10 discharge unit
10A hole portion
10B slope surface
10C bottom surface
11 object removing unit
40 light source unit
41r R light source
41g G light source
41b B light source
42r, 42g, 42b collimator lens
43 dichroic prism
44 light modulation element
45 driving unit
46 light source control unit
47 system control unit E eyes
H steering wheel
OB object
X direction

What is claimed is:

1. A projection display device comprising:
a light modulation unit that spatially modulates, in accordance with image data that is input, light emitted by a light source;
a housing that accommodates the light modulation unit;
a projection optical system that is accommodated in the housing and projects the light that has been spatially modulated onto a projection surface of a vehicle through an opening portion of the housing; and
a cover that closes the opening portion,
wherein
the cover has a shape whose longitudinal direction is a direction extending from a driver's seat of the vehicle toward a passenger seat of the vehicle,
a front surface of the cover is closer to the projection surface than a reference plane is, the reference plane passing through a passenger-side end portion in the longitudinal direction of the front surface of the cover and being parallel to the longitudinal direction, and has a shape in which a distance from the reference plane gradually decreases from a position other than the passenger-side end portion in the longitudinal direction toward the passenger-side end portion, and
the position other than the passenger-side end portion is a position between a driver-side end portion in the longitudinal direction of the front surface of the cover and the passenger-side end portion.

2. The projection display device according to claim 1, wherein
the distance to the front surface of the cover is constant from the position other than the passenger-side end portion to the driver-side end portion.

3. The projection display device according to claim 2, further comprising:
a discharge unit to which an object adhered to the front surface of the cover and moved to the passenger-side end portion is to be discharged.

4. The projection display device according to claim 3, further comprising:
an object removing unit that moves an object adhered to the front surface of the cover to the discharge unit to remove the object.

5. The projection display device according to claim 1, further comprising:
a discharge unit to which an object adhered to the front surface of the cover and moved to the passenger-side end portion is to be discharged.

6. The projection display device according to claim 5, further comprising:
an object removing unit that moves an object adhered to the front surface of the cover to the discharge unit to remove the object.

7. The projection display device according to claim 1, wherein
the housing comprises the driver-side end portion and the passenger-side end portion respectively located at two opposite sides of the opening portion in the longitudinal direction, wherein the distance remains constant from the position other than the passenger-side end portion toward the driver-side end portion in the longitudinal direction.

8. A projection display device comprising:
a light modulation unit that spatially modulates, in accordance with image data that is input, light emitted by a light source;
a housing that accommodates the light modulation unit;
a projection optical system that is accommodated in the housing and projects the light that has been spatially modulated onto a projection surface of a vehicle through an opening portion of the housing; and
a cover that closes the opening portion,
wherein
the cover has a shape whose longitudinal direction is a direction extending from a driver's seat of the vehicle toward a passenger seat of the vehicle,
a front surface of the cover is closer to the projection surface than a reference plane is, the reference plane passing through a passenger-side end portion in the longitudinal direction of the front surface of the cover and being parallel to the longitudinal direction, and has a shape in which a distance from the reference plane gradually decreases from a position other than the passenger-side end portion in the longitudinal direction toward the passenger-side end portion, and
the projection display device further comprises a discharge unit to which an object adhered to the front surface of the cover and moved to the passenger-side end portion is to be discharged.

9. The projection display device according to claim 8, wherein
the position other than the passenger-side end portion is a position of a driver-side end portion in the longitudinal direction of the front surface of the cover.

10. The projection display device according to claim 9, further comprising:
an object removing unit that moves an object adhered to the front surface of the cover to the discharge unit to remove the object.

11. The projection display device according to claim 8, wherein
the position other than the passenger-side end portion is a position between a driver-side end portion in the longitudinal direction of the front surface of the cover and the passenger-side end portion.

12. The projection display device according to claim 11, wherein
the distance to the front surface of the cover is constant from the position other than the passenger-side end portion to the driver-side end portion.

13. The projection display device according to claim 12, further comprising:
an object removing unit that moves an object adhered to the front surface of the cover to the discharge unit to remove the object.

14. The projection display device according to claim 11, further comprising:
an object removing unit that moves an object adhered to the front surface of the cover to the discharge unit to remove the object.

15. The projection display device according to claim 8, further comprising:
an object removing unit that moves an object adhered to the front surface of the cover to the discharge unit to remove the object.

* * * * *